(12) United States Patent
Rota et al.

(10) Patent No.: US 6,531,223 B1
(45) Date of Patent: Mar. 11, 2003

(54) PRIMERLESS LATEX PAINT WITH TANNIN BLOCKING

(75) Inventors: Darlene D. Rota, Middleburg Heights, OH (US); Lorette Madigan, Cleveland, OH (US); Elizabeth C. Bell, Wickliffe, OH (US); Robert A. Martuch, Parma, OH (US)

(73) Assignee: The Sherwin-Williams Company, Cleveland, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/835,447

(22) Filed: Apr. 16, 2001

Related U.S. Application Data

(63) Continuation-in-part of application No. 09/263,700, filed on Mar. 5, 1999, now Pat. No. 6,218,012.
(60) Provisional application No. 60/077,548, filed on Mar. 11, 1998.

(51) Int. Cl.[7] .......................... B32B 15/02; B32B 19/00; B32B 21/02; B05D 7/00; C08L 27/08
(52) U.S. Cl. ...................... 428/402; 428/403; 428/406; 428/407; 427/195; 427/218; 427/407.1; 427/408; 524/568; 524/204; 524/205; 524/280; 524/457; 524/565; 524/567
(58) Field of Search ................................ 428/402, 403, 428/406, 407; 427/195, 218, 407.1, 408; 524/568, 204, 205, 280, 457, 565, 567

(56) References Cited

U.S. PATENT DOCUMENTS

| | | | |
|---|---|---|---|
| 4,132,560 A | 1/1979 | Marquisee et al. | 106/288 B |
| 4,171,228 A | 10/1979 | Lowrey | 106/288 B |
| 4,623,390 A | 11/1986 | Delmonico | 106/15.05 |
| 4,904,709 A | 2/1990 | Hermele | 523/220 |
| 5,011,862 A | 4/1991 | Melber et al. | 521/54 |
| 5,041,487 A | 8/1991 | Kissel | 524/377 |
| 5,312,863 A | 5/1994 | Van Rheenen et al. | 524/555 |
| 5,320,872 A | 6/1994 | McNeel et al. | 427/393 |
| 5,399,189 A | 3/1995 | Glorieux | 106/14.41 |
| 5,486,576 A | 1/1996 | Larson et al. | 525/375 |
| 6,218,012 B1 * | 4/2001 | Rota et al. | |

OTHER PUBLICATIONS

Journal of Coatings Technology, "The Use of Spherical Extenders in VOC Compliant Coatings", Jul. 1997, vol. 69, No. 870.
EPS 2532 Engineered Polymer Solutions, Inc., Supplier's Literature.
Rhoplex MV–23LO Rohm and Haas Company, Supplier's Literature, Jan. 1992.

* cited by examiner

*Primary Examiner*—Duc Truong
(74) *Attorney, Agent, or Firm*—Paul R. Katterle; Robert E. McDonald; Vivien Y. Tsang

(57) ABSTRACT

A water based coating composition which does not require a primer for application over wood, masonry, metal, vinyl siding and previously painted surfaces and can be applied over these surfaces in a single coat to provide the tannin blocking, hiding, corrosion resistance and durability of a conventional primer plus two coats of latex paint.

12 Claims, No Drawings

PRIMERLESS LATEX PAINT WITH TANNIN BLOCKING

CROSS-REFERENCE TO RELATED APPLICATION

This application is a continuation-in-part of U.S. patent application Ser. No. 09/263,700, file date Mar. 5, 1999 now U.S Pat. No. 6,218,012 and claims benefit of U.S. provisional application Ser. No. 60/077,548 filed Mar. 11, 1998.

BACKGROUND OF THE INVENTION

In general, conventional aqueous based latex topcoats require using a primer undercoat to provide adequate adhesion and tannin blocking to wood and previously painted surfaces. Tannin blocking is the ability of a coating to prevent water-soluble chromophoric compounds, present in or on a substrate or substrate coating, from migrating through a newly applied topcoat. For example, certain woods such as redwood and cedar contain tannin staining agents. If a conventional latex coating is applied to the wood, these staining agents become extracted from the wood and migrate through the coating. Repeated applications of the same or a similar type of aqueous latex coating will not successfully prevent these stains from reappearing on the new coating surface. Solvent based coatings are typically effective in blocking these stains since the stains are not solubilized by the coating solvent.

While there are certain benefits to using a solvent based coating, aqueous coatings are preferred over solvent-based coatings for many reasons. Reduction of the VOC of the coating is an advantage offered by latex coatings. In addition, alkyd coatings are not generally as crack, fade and flake resistant as latex based coatings, particularly in exterior applications. Specially designed latex based coatings may have better adhesion to substrates such as galvanized steel and cement based substrates. Latex based coatings also offer easy water clean-up. The latex based primers currently available provide adequate stain blocking, but in order to obtain the necessary durability and attractive appearance for exterior applications, it is recommended that the latex based primer be coated with two additional layers of latex paint. The latex primer improves adhesion to the substrate and helps to insure a uniform appearance of the top coat. Primers must be top coated because they are discolored by the tannins contained in the substrate. The latex primers function by letting the tannins migrate into the primer and then trapping the tannins in the primer. This prevents subsequent latex layers from being discolored by the tannins. The additional layers of latex paint provide the durability to withstand weathering and provide a uniform, attractive appearance to the resulting coated substrate. It is desirable, however, to obtain the stain blocking properties and durability of a three layer latex coating system in a single layer of latex based coating.

The present invention is directed to a latex paint which does not require a primer for application over wood, masonry, metal, vinyl siding and previously painted surfaces. The latex paint of the present invention can be applied in a single coat directly over these surfaces to provide the tannin blocking, hiding, corrosion resistance and durability of a conventional primer plus two coats of latex paint. This primerless paint is useful for both interior and exterior applications.

SUMMARY OF THE INVENTION

The present invention is directed to a water-based coating composition including a tannin blocking latex resin, microspheres, and a reactive pigment. The microspheres have a maximum pigment loading of at least 50% and are selected from the group consisting of expanded acrylonitrile/vinylidene chloride copolymer particles, sodium potassium aluminum silicate particles, polyvinylidene chloride copolymer particles coated with calcium carbonate, ceramic particles, glass particles, and polyethylene particles. The coating composition has a PVC of 25 to 65% and a NVV of 30 to 50%. A single coat of the coating composition has exterior durability as measured by QUV testing and indicated by a $\Delta E$ of less than 3, and tannin blocking as measured on a redwood substrate and indicated by at least a 30% improvement in the y-reflectance.

The present invention is further directed to a coated substrate wherein the foregoing coating composition is disposed over a substrate containing tannin.

The present invention is further directed to a process for coating a substrate containing tannin. The method consists essentially of applying a single coat of the foregoing coating composition to the substrate and allowing the coating composition to dry.

DETAILED DESCRIPTION OF THE INVENTION

The present invention is directed to a latex paint which, when applied as a single coat, provides the hiding, tannin blocking, corrosion resistance, durability and application performance of a conventional paint system consisting of a primer coat plus two coats latex paint. The latex paint of the present invention comprises a tannin-blocking latex emulsion and low water absorbing microspheres.

Tannin blocking emulsions useful in the present invention include those water-borne polymer emulsions that are effective in preventing the water soluble phenolic compounds from penetrating the coating. Commercially available tannin blocking latex emulsions include Rhoplex® MV-23LO emulsion copolymer from Rohm and Haas Company which is an all acrylic composition and EPS 2532 emulsion from Engineered Polymer Solutions, Inc. which is a styrenated acrylic composition. Tannin blocking emulsions are those emulsions having a rating of at least 2 on the tannin stain blocking test described below. The tannin blocking latex emulsions may be used alone, or may be used in combination with a conventional latex emulsion. The amount of tannin blocking latex emulsion present in the coating composition is generally at least about 15% by weight of the total latex emulsion present in the coating composition.

Conventional latex emulsions include those prepared by polymerizing at least one ethylenically unsaturated monomer in water using surfactants and water soluble initiators. Typical ethylenically unsaturated monomers include vinyl monomers, acrylic monomers, allylic monomers, acrylamide monomers and mono- and dicarboxylic unsaturated acids. Vinyl esters include vinyl acetate, vinyl propionate, vinyl butyrates, vinyl isopropyl acetates, vinyl neodeconate and similar vinyl esters; vinyl halides include vinyl chloride, vinyl fluoride and vinylidene chloride; vinyl aromatic hydrocarbons include styrene, $\alpha$-methyl styrene, and similar lower alkyl styrenes. Acrylic monomers include monomers such as lower alkyl esters of acrylic or methacrylic acid having an alkyl ester portion containing between 1 to 12 carbon atoms as well as aromatic derivatives or acrylic and methacrylic acid. Useful acrylic monomers include, for example, acrylic and methacrylic acid, methyl acrylate, and methacrylate, ethyl acrylate and methacrylate, butyl acrylate and methacrylate, propyl acrylate and methacrylate, 2-ethyl hexyl acrylate and methacrylate, cyclohexyl acrylate and methacrylate, decyl acrylate and methacrylate, isodecylacrylate and methacrylate, and benzyl acrylate and methacrylate.

Preparation of latex compositions is well-known in the paint and coatings art. Any of the well-known free-radical emulsion polymerization techniques used to formulate latex polymer can be used in the present invention. Polymerization techniques suitable for use herein are taught in U.S. Pat. No. 5,486,576, incorporated by reference.

The addition of low water absorbing microspheres to the paint composition provides a paint composition having a high volume solids content. Useful low water absorbing microspheres include those microspheres having a maximum pigment loading of at least 50%. The Maximum Pigment Loading (MPL) percentage is an indication of the water absorption of the spherical particles. The higher the MPL, the lower the water absorption of the particles. The MPL for an extender is determined by first preparing a Base Mix as follows:

| Base Mix | Parts by Weight |
| --- | --- |
| water | 75 |
| propylene glycol | 15 |
| tetra potassium pyro phosphate | 0.5 |
| Tamol 963 surfactant | 6.0 |
| Triton X-102 surfactant | 2.5 |
| Strodex PK-90 surfactant | 1.0 |

Using the Base Mix, a plurality of samples are prepared using different amounts of the extender. Each sample is prepared and evaluated as follows:

First, 300 grams of the Base Mix are added to a container having a diameter of 7 inches. A 3 inch HSD blade placed 1 inch from the bottom of the container is used for mixing the Base Mix. Next, the extender is added to the container and mixing continues for 5 minutes. The sample is then cooled to 77° F. (±3°) and the viscosity is measured using an LV Brookfield viscometer. The amount by weight of extender added is converted into a volume amount for the sample.

Using the foregoing procedure, a plurality of viscosity values for different amounts of the extender are obtained. These viscosity value are plotted vs. the gallons of dry extender per 12.65 gallons of Base Mix. From the plots, the MPL is determined. The plots result in a hyperbolic shape in which two straight lines can be drawn from the two constant slopes. The intersection of these two lines represents the point at which the mixture becomes dilatent. The x-axis reading of this point is the MPL. The MPL percentage is equal to the maximum pigment volume divided by the sum of the maximum pigment volume and Base Mix volume.

The MPL for several conventional extenders as well as several microsphere extenders are shown in Table A below.

TABLE A

| Extender/Pigment | MPL (%) |
| --- | --- |
| hydrous Clay | 25 |
| Halox BW-100 | 30 |
| Silicon Dioxide | 37 |
| nepheline syenite | 37 |
| Diatomaceous Silica | 22 |
| Calcium Carbonate | 47 |
| Dualite 27 | 67 |

TABLE A-continued

| Extender/Pigment | MPL (%) |
| --- | --- |
| SilCel 35/34 | 59 |
| Z-Light Spheres | 62 |
| Expancel 551DE20 | 67 |
| Scotchlite K46 | 72 |
| Sphericel | 69 |
| Vistamer | 70 |

Microspheres useful in the present invention have an MPL of at least 50%. Examples of such low water absorbing microspheres include Expancel 551 DE20, an expanded acrylonitrile/vinylidene chloride copolymer commercially available from Expancel, Inc.; Sil-Cell 35/34, sodium potassium aluminum silicate particles commercially available from Silbrico Corporation; Dualite 27 polyvinylidene chloride copolymer coated with calcium carbonate, commercially available from Pierce & Stevens Corporation; Fillite 150 ceramic spherical particles commercially available from Fillite North America, Inc.; Microbeads 4A soda lime plate glass particles, commercially available from Cataphote Inc.; Sphericel® hollow glass spheres commercially available from Potter Industries Inc.; Eccosphere FTD 235 hollow glass spheres commercially available from Emerson & Cumming; Z-Light Sphere W-1200, ceramic hollow spheres commercially available form Zeelan Industries Inc.; Scotchlite K46 glass bubbles commercially available from 3M, and Vistamer UH 1500 and Vistamer HD 1800, polyethylene particles commercially available from Composite Particle. Preferably, the microspheres have a diameter from about 1 to about 210 microns.

Pigments, such as titanium dioxide and extenders, such as zinc oxide, silicon oxide, clay, calcium carbonate, talc and nepheline syenite may be added to the paint of the present invention.

The amount of low water absorbing microspheres present in the coating composition is at least 50% by volume of the total amount of extenders present. Preferably, the microspheres make up at least about 75% by volume of the total amount of extenders present. Of the total volume of the coating composition, the low water absorbing microspheres make up at least 5% by volume.

There are paint additives that are useful in helping to control the problem of tannin stain bleed. These additives contain cations that will form lightly-colored water insoluble compounds with the tannate ions to prevent their migration through the paint film. Reactive pigments, which include base pigments such as wollastonite, talc or mica in combination with phosphate or borate of Ca or Zn, and as a doping agent or active additive, one amphoteric metal hydrate of Al, Ti, Zr, Zn or Si may be added to the paint composition. A preferred reactive pigment is calcium barium phosphosilicate, commercially available as Halox BW-100 from Halox Pigments. Other reactive pigments that may be used in the paint composition include calcium phosphosilicate and aluminum zirconium phosphosilicate.

A complexing agent for a transition metal ion may also be included in the paint composition. A preferred complexing agent is a salt of phosphonic acid commercially available as Bubond 357 from Buckman Laboratories.

Extenders useful in helping to prevent the migration of tannate ions include calcium carbonate, nepheline syenite, talc and zinc oxide. The pigments and extenders present in the paint formulation contribute to the in tannin blocking characteristics in the paint film.

The relationship between durability of the coating and the amount of pigment is represented by pigment volume concentration (PVC), which is the fractional volume of pigment in a unit volume of resin. Thus, low PVC coatings, such as semi-gloss paints, contain relatively low levels of pigment, and high PVC coating compositions, such as satin to flat paints, contain high levels of pigments. The PVC of the coating composition of the present invention is generally within the range of 25 to 65%, and preferably about 40%. The solids content by volume (NVV) of the coating composition is generally within the range 30–50%, and preferably at least 40%.

The latex paint of the present invention is prepared according to standard manufacturing techniques. Such techniques involve the preparation of a polymeric binder or binders, mixing of component materials, dispersing of pigments, and a thinning adjustment to commercial standards. High speed dispersers or dissolvers are typically used in the dispersing step to intersperse the pigments into a liquid phase containing other paint components. The binder and pigment dispersions can be thoroughly and uniformly mixed with raw batch ingredients by homogenizing the binders, pigments, plasticizers and other components to form a uniform blend. The polymeric binder further maintains the pigment in stable dispersion. Although special equipment conventionally used to produce high solid systems or incorporate microspheres can be employed, this invention requires no modification to any conventional latex paint manufacturing process.

The following examples illustrate the latex paint of the present invention.

EXAMPLES 1–7

EXAMPLE 1

A paint coating composition comprising the following raw materials was produced:

|  | Weight % |
| --- | --- |
| EPS 2532 | 43.02 |
| defoamer | 0.48 |
| water | 8.43 |
| propylene glycol cosolvent | 2.41 |
| attapulgite thickener | 0.19 |
| hydroxy ethyl cellulose thickener | 0.10 |
| tetrapotassium pyrophospate surfactant | 0.19 |
| zinc oxide | 2.41 |
| ammonium salt of acrylic polymer surfactant | 0.97 |
| octyl phenol polyether alcohol surfactant | 0.39 |
| potassium salt of organic polyphosponic ester acid surfactant | 0.19 |
| Bubond 357 tannin blocker | 0.97 |
| defoamer | 0.10 |
| Halox BW-100 tannin blocker | 5.79 |
| silicon dioxide | 5.29 |
| Sil-Cell 35/34 | 1.51 |
| mildewcide | 0.24 |
| TiO$_2$ slurry | 23.17 |
| trimethyl pentanediol monoisobutyrate | 2.41 |
| hydroxyl ethyl cellulose | 0.49 |

-continued

|  | Weight % |
| --- | --- |
| polyether polyol thickener | 0.97 |
| defoamer | 0.29 |

EXAMPLE 2

A coating composition was prepared substantially in accordance with that of Example 1, except that hydrous clay was used in place of the silicon dioxide and the Sil-Cell sodium potassium aluminum silicate microspheres were replaced with Z-Light Sphere 1200 ceramic hollow spheres.

EXAMPLE 3

A coating composition was prepared substantially in accordance with that of Example 1, except that the tannin blocking resin used was Rhoplex MV-23 and hydrous clay was used in place of the silicon dioxide. In addition the microspheres used were Sphericel hollow glass spheres.

EXAMPLE 4

A coating composition was prepared substantially in accordance with that of Example 1 except that the tannin blocking resin used was Rhoplex MV-23 and the silicon dioxide extender was replaced with calcium carbonate.

EXAMPLE 5

A coating composition was prepared substantially in accordance with that of Example 1, except that the tannin blocking resin used was Rhoplex MV-23, the silicon dioxide extender was replaced with nepheline syenite extender and the microspheres used were Expancel 551 DE20 expanded acrylonitrile/vinylidene chloride copolymer.

EXAMPLE 6

A coating composition was prepared substantially in accordance with that of Example 1, except that the silicon dioxide extender was replaced with nepheline syenite and the microspheres used were Sphericel hollow glass spheres.

EXAMPLE 7

A coating composition was prepared substantially in accordance with that of Example 1, except that the tannin blocking resin used was Rhoplex MV-23, the silicon dioxide was replaced with nepheline syenite and the microspheres used were Expancel 551 DE20 expanded acrylonitrile/vinylidene chloride copolymer.

Table I below summarizes the composition and characteristics of Examples 1–7:

TABLE I

| Example | Micro-Sphere | Extender | Binder | PVC | NVV | KU | ICI | PH | Wt/Gal | Corrosion | Tannin |
|---|---|---|---|---|---|---|---|---|---|---|---|
| 1 | Sil-Cell | Silica | EPS | 45 | 40.72 | 103 | 1.0 | 8.15 | 10.60 | 7.67 | 5 |
| 2 | Z-Light | Clay | EPS | 62 | 40.72 | 102 | 1.3 | 8.26 | 9.58 | 4.00 | 3 |
| 3 | Sphericel | Clay | MV | 62 | 40.21 | 99 | 1.7 | 8.08 | 11.41 | 10 | 3 |
| 4 | Sil-Cell | Calcium Carbonate | MV | 45 | 38.27 | 101 | 1.1 | 7.82 | 11.02 | 10 | 4 |
| 5 | Expancel | Nepheline Syenite | MV | 45 | 37.00 | 99 | 1.4 | 8.25 | 10.43 | 10 | 3 |
| 6 | Sphericel | Nepheline Syenite | EPS | 62 | 40.72 | 106 | 1.5 | 8.58 | 10.92 | 6.67 | 4 |
| 7 | Expancel | Nepheline Syenite | MV | 62 | 40.21 | 100 | 0.9 | 8.60 | 10.14 | 10 | 4 | tannin scale 0–5
0 = no improvement/no tannin blocking

The coating compositions of the present invention were evaluated for tannin stain blocking and corrosion resistance. Tannin stain blocking was measured by first applying the coating composition to a six-inch section of a redwood panel and allowing the coating to dry overnight (approximately 16 hours). The dry.film thickness of the coating was about 4 mils. The panels were placed in a QCT (Cleveland Condensing Cabinet) which was maintained at 100° F. for 24 hours. The panels were removed from the QCT and allowed to dry thoroughly. Control panels were prepared by applying two coats of a commercially available premium quality exterior latex paint (hereinafter referred to as the "Control Paint") to redwood panels. The Control Paint is a white pastel base containing an acrylic polymer and having a volume solids content NVV of 34%, a pigment volume concentration (PVC) of 42% and a y-reflectance of 86.31. The formulation for the Control Paint is set forth in Control Example 1. The total dry film thickness of the coating was about 4 mils. The control panels were subjected to the QCT in the same manner as the coating compositions of the present invention. Each coating composition was applied to 4 different redwood panels and the y-reflectance of the coated panels was measured using FMC II mathematics and a MacBeth Color-eye spectrophotometer. The percentage improvement in y-reflectance of each coating composition of the present invention over the control coating was determined and then assigned a relative rating of 0 to 5. A rating of 0 indicates no improvement in tannin blocking over the control coating and a rating of 5 indicates at least a 50% improvement over the control coating. A tannin blocking rating of at least 3 indicates the coating composition exhibits superior tannin blocking.

Corrosion resistance was measured by applying the 2.0 grams of each coating composition to a 3 inch by 3 inch section of a cold rolled steel panel. After allowing the panel to dry overnight, (approximately 16 hours) the panel was placed on a QCT maintained at 100 F for 8 hours. The panels were qualitatively rated on a scale of 1 to 10, with 10 indicating superior corrosion resistance. A rating below 5 indicates unacceptable corrosion resistance.

EXAMPLES 8–10

Paint compositions comprising the following raw materials were produced:

|  | Ex. 8 Weight % | Ex. 9 Weight % | Ex. 10 Weight % |
|---|---|---|---|
| Rhoplex Multilobe 200 | 36.10 | — | — |
| Rhoplex MV23 | — | 45.13 | — |
| EPS 2532 | — | — | 50.98 |
| defoamer | 0.49 | 0.48 | 0.54 |
| Water | 8.78 | 7.31 | 4.82 |
| propylene glycol cosolvent | 1.95 | 1.95 | 2.71 |
| attapulgite thickener | 0.20 | 0.19 | 0.11 |
| hydroxy ethyl cellulose thickener | 0.10 | 0.10 | — |
| tetra potassium pyrophospate surfactant | 0.20 | 0.19 | 0.22 |
| zinc oxide | 2.44 | 2.44 | 2.71 |
| ammonium salt of acrylic polymer surfactant | 0.98 | 0.97 | 1.08 |
| octyl phenol polyether alcohol surfactant | 0.39 | 0.39 | 0.43 |
| potassium salt of organic polyphosponic ester acid | 0.20 | 0.19 | 0.22 |
| Bubond 357 tannin blocker | 0.98 | 0.97 | 1.08 |
| defoamer | 0.10 | 0.10 | 0.11 |
| Halox BW-100 tannin blocker | 5.85 | 5.84 | 5.41 |
| nepheline syenite | 5.85 | 5.84 | — |
| Expancel 551 DE 20 | 0.44 | 0.44 | — |
| Sil-Cell | — | — | 3.46 |
| mildewcide | 0.24 | 0.24 | 0.27 |
| TiO$_2$ slurry | 23.42 | 23.39 | 21.65 |
| trimethyl pentanediol monoisobutyrate | 1.95 | 1.95 | 2.16 |
| hydroxy ethyl cellulose | 0.49 | 0.49 | 0.54 |
| polyether polyol thickener | 0.98 | 0.97 | 1.08 |
| defoamer | 0.29 | 0.29 | 0.32 |
| water | 7.60 | 0.10 | — |

The paint compositions of Examples 9 and 10 were combined in various weight percentages with the composition of Example 8, which does not contain a tannin blocking latex resin. The corrosion resistance and tannin stain blocking were measured for the resulting compositions as shown in Table II.

TABLE II

| Example | Wt. % Ex. 8 | Wt. % Ex. 9 | Wt. % Ex. 10 | Corrosion Resistance Rating | Tannin Blocking Rating |
|---|---|---|---|---|---|
| 8 | 100 | 0 | 0 | 2 | 3 |
| A | 95 | 5 | 0 | 4 | 3 |
| B | 90 | 10 | 0 | 4 | 3 |
| C | 85 | 15 | 0 | 5 | 3 |
| D | 80 | 20 | 0 | 7 | 3 |

TABLE II-continued

| Example | Wt. % Ex. 8 | Wt. % Ex. 9 | Wt. % Ex. 10 | Corrosion Resistance Rating | Tannin Blocking Rating |
|---|---|---|---|---|---|
| E | 75 | 25 | 0 | 9 | 3 |
| 9 | 0 | 100 | 0 | 10 | 4 |
| F | 95 | 0 | 5 | 3 | 3 |
| G | 90 | 0 | 10 | 3 | 3 |
| H | 85 | 0 | 15 | 4 | 4 |
| I | 80 | 0 | 20 | 4 | 3 |
| J | 75 | 0 | 25 | 5 | 3 |
| 10 | 0 | 0 | 100 | 10 | 5 |

The durability of the coating compositions was evaluated by subjecting the coating compositions to QUV testing. Each coating composition was tinted with 3 ounce/gallon of phalocyanine blue colorant and applied to an aluminum panel using a 7 mil clearance Dow-type applicator and allowed to dry for 1 week. The panels were then placed on a QUV weatherometer and cycled between a UV light cycle at 60° C. for 4 hours using UVA340 bulbs (Radient.77) and a condensation cycle at 50° C. for 4 hours. The total cycle time was 1000 hours with about 500 hours of UV light time. The coatings were evaluated by measuring the $\Delta L$ (change in lightness/darkness) and $\Delta E$ (total change in color).

TABLE III

| Example | $\Delta L$ | $\Delta E$ |
|---|---|---|
| 9 | 0.36 | 1.52 |
| 10 | −0.12 | 2.4 |
| E | −0.05 | 1.64 |
| Control* | 2.8 | 11.69 |

*Control Paint of Control Example 1

EXAMPLE 11

A paint coating composition comprising the following raw materials was produced:

| | Weight % |
|---|---|
| Rhoplex Multilobe 200 | 26.71 |
| Rhoplex MV23 | 8.62 |
| defoamer | 0.47 |
| water | 8.52 |
| propylene glycol cosolvent | 2.37 |
| attapulgite thickener | 0.19 |
| hydroxy ethyl cellulose thickener | 0.09 |
| tetra potassium pyrophospate surfactant | 0.19 |
| zinc oxide | 2.37 |
| ammonium salt of acrylic polymer surfactant | 0.95 |
| octyl phenol polyether alcohol surfactant | 0.38 |
| potassium salt of organic polyphosponic ester acid surfactant | 0.19 |
| Bubond 357 tannin blocker | 0.95 |
| defoamer | 0.09 |
| Halox BW-100 tannin blocker | 5.68 |
| nepheline syenite | 4.74 |
| Expancel 551 DE 20 | 0.19 |
| Rhoplex MV23 | 4.74 |
| diatomaceous silica | 1.42 |
| mildewcide | 0.24 |
| TiO$_2$ slurry | 22.74 |
| trimethyl pentanediol monoisobutyrate | 2.37 |
| hydroxy ethyl cellulose thickener | 0.47 |
| polyether polyol thickener | 0.95 |
| defoamer | 0.28 |
| water | 3.98 |

This paint composition was evaluated for durability by the accelerated exterior exposure test EMMAQUA (ASTM G90). For this test, aluminum panels were coated with a single coat and a double coat of the coating composition of Example 11. In Example NP, a panel was coated with two coats of the Control Paint of Control Example 1. In Example P1, a panel was coated with a single coat of a commercially available latex primer followed by two coats of the Control Paint of Control Example 1. In Example P2, a panel was coated with a single coat of a commercially available alkyd primer followed by two coats of the Control Paint of Control Example 1. The spread rate for the topcoats was 300 ft$^2$/gal for each coat. As shown in Table IV, a single layer of the coating composition of the present invention out performed two layers of the commercially available paint which was applied over a primer layer.

TABLE IV

| | | | | 6 months | | 12 months | |
|---|---|---|---|---|---|---|---|
| Example | Primer | No. of Coats | Panel | $\Delta L$ | $\Delta E$ | $\Delta L$ | $\Delta E$ |
| 11 | no | 1 | 1 | 0.29 | 2.82 | 6.29 | 8.32 |
| 11 | no | 1 | 2 | 3.70 | 5.20 | 14.15 | 16.33 |
| 11 | no | 2 | 1 | 0.16 | 1.27 | 10.76 | 12.23 |
| 11 | no | 2 | 2 | −0.37 | 1.41 | 11.07 | 12.66 |
| NP | no | 2 | 1 | 36.47 | 44.03 | 50.14 | 58.27 |
| P1 | latex | 2 | 1 | 30.60 | 37.68 | 51.91 | 60.95 |
| P2 | alkyd | 2 | 1 | 14.99 | 30.64 | 49.53 | 58.22 |

CONTROL EXAMPLE 1

The Control Paint referred to earlier was produced from the following raw materials:

| | Weight % |
|---|---|
| SW-23 Acrylic Latex | 18.76 |
| CL-36 Acrylic Latex | 6.01 |
| SCX-2577 Acrylic Latex | 4.64 |
| water | 24.81 |
| propylene glycol | 1.46 |
| attapulgite thickener | 0.18 |
| hydroxy ethyl cellulose thickener | 0.77 |
| tetra potassium pyrophospate surfactant | 0.18 |
| zinc oxide | 2.28 |
| Surfynol TG nonionic surfactant | 0.46 |
| Rhodoline 226/35 dispersant | 0.82 |
| Defoamer | 0.64 |
| 2-amino-2-methyl-1-propanol | 0.18 |
| anhydrous clay | 5.92 |
| silicon dioxide | 4.28 |
| 15 micron silica | 4.28 |
| diatomaceous silica | 1.82 |
| mildewcide | 0.27 |
| aqueous ammonia 28% | 0.09 |
| Texanol 12 carbon ester alcohol | 2.28 |
| TiO$_2$ slurry | 19.85 |
| Yellow oxide dispersion | 0.02 |
| | 100 |

The Control Paint has an NVV of 34%, a PVC of 42%, an X-reflectance of 81.72, a Y-reflectance of 86.31, and a Z-reflectance of 86.26.

EXPOSURE TESTING

The coating composition of the present invention was evaluated for exterior durability on various substrates and compared to 14 different commercially available exterior latex paints. The paints were exposed for 22 months to the climate of Ohio and then evaluated for tannin blocking, adhesion to different substrates, corrosion resistance, efflorescence and cracking. For the tannin blocking test, the coating of the present invention was applied as a single coating having a dry film thickness of about 4 mils over redwood panels that were not primed. The commercial exterior paints were applied as two coats having a dry film thickness of about 4 mils over redwood panels that had not primed and redwood panels that had been primed with a latex primer having a dry film thickness of about 2 mils. Each coating was applied to multiple redwood panels and the results presented in Table V are the average rating for each coating.

The adhesion of the paints was evaluated by applying each paint to a glossy alkyd substrate, a chalky alkyd substrate, a chalky aluminum substrate, a weathered vinyl substrate and a galvanized steel substrate. The glossy alkyd substrate had a 60° gloss of 75. The chalky alkyd substrate had an ASTM D4214 chalk rating of 6 and the chalky aluminum substrate had a chalk rating of 2. The coating of the present invention was applied to each substrate in a single coat having a dry film thickness of about 4 mils. The commercially available comparative paints were each applied to the different substrates in two coats having a total dry film thickness of about 4 mils. The corrosion resistance of the paints was evaluated by applying the coating composition of the present invention (single coat) and the commercially available comparative paints (2 coats) to cold rolled steel substrates. The degree of efflorescence of the paints was evaluated by applying the coating composition of the present invention (single coat) and the commercially available comparative paints (2 coats) to hot (high pH) cement panels. The hot cement panels were prepared by brushing onto the panels an aqueous solution of Block Aid powder, commercially available from Glidden, and then coating the panels within 24 hours with the paint to be evaluated. The cracking resistance of the paints was evaluated by applying the coating composition of the present invention (single coat) and the commercially available comparative paints (2 coats) to Southern yellow pine panels. As shown in Table V, the coating composition of the present invention consistently obtained good and excellent ratings for tannin blocking, adhesion to various substrates, corrosion resistance, efflorescence and cracking.

TABLE V

| Test Paint | TANNIN Unprimed | TANNIN Primed | ADHESION gloss alkyd | ADHESION chalky alkyd | ADHESION chalky aluminum | ADHESION weathered vinyl | ADHESION galvanized steel | CORROSION | EFFLOR-ESENCE | CRACKING |
|---|---|---|---|---|---|---|---|---|---|---|
| Example 11 | 4.5 | 4.0* | 4.5 | 5.0 | 5.0 | 4.0 | 5.0 | 4.0 | 4.0 | 4.5 |
| Com 1 | 4.0 | 4.0 | 1.0 | 3.0 | 5.0 | 4.0 | 5.0 | 4.0 | 1.0 | 3.5 |
| Com 2 | 3.0 | 4.0 | 5.0 | 5.0 | 5.0 | 4.0 | 4.5 | 3.0 | 3.0 | 4.5 |
| Com 3 | 2.0 | 3.0 | 2.0 | 3.0 | 5.0 | 5.0 | 3.0 | 4.0 | 3.0 | 4.5 |
| Com 4 | 3.0 | 3.5 | 1.0 | 3.0 | 3.0 | 3.0 | 1.0 | 2.0 | 1.0# | 2.5 |
| Com 5 | 3.5 | 3.5 | 5.0 | 5.0 | 5.0 | 5.0 | 2.0 | 3.0 | 1.0 | 4.5 |
| Com 6 | 2.0 | 3.0 | 3.0 | 3.0 | 5.0 | 5.0 | 4.5 | 2.0 | 3.0 | 3.5 |
| Com 7 | 3.0 | 2.0 | 4.0 | 4.0 | 5.0 | 3.0 | 5.0 | 2.0 | 3.0 | 3.0 |
| Com 8 | 3.0 | 2.0 | 5.0 | 5.0 | 5.0 | 3.0 | 5.0 | 5.0 | 3.0 | 4.0 |
| Com 9 | 1.0 | 1.0 | 4.0 | 3.0 | 5.0 | 3.0 | 4.5 | 3.0 | 1.0# | 3.0 |
| Com 10 | 3.5 | 4.0 | 4.0 | 4.0 | 5.0 | 3.0 | 3.0 | 1.0 | 1.0 | 2.0 |
| Com 11 | 3.0 | 3.0 | 5.0 | 5.0 | 5.0 | 5.0 | 3.0 | 3.0 | 1.0# | 4.5 |
| Com 12 | 3.5 | 3.5 | 3.0 | 3.0 | 2.0 | 3.0 | 5.0 | 5.0 | 5.0 | 1.0 |
| Com 13 | 3.0 | 4.0 | 5.0 | 5.0 | 5.0 | 4.0 | 4.5 | 3.0 | 3.0 | 4.5 |
| Com 14 | 1.0 | 2.0 | 5.0 | 5.0 | 5.0 | 5.0 | 3.5 | 2.0 | 1.0# | 3.5 |

5 = Excellent 4 = Good 3 = Fair 2 = Poor 1 = Very Poor
*not primed
peeling

We claim:

1. A water-based coating composition comprising:
   a) at least one tannin blocking latex resin; and
   b) microspheres having a maximum pigment loading of at least 50% said microspheres being selected from the group consisting of expanded acrylonitrile/vinylidene chloride copolymer particles, sodium potassium aluminum silicate particles, polyvinylidene chloride copolymer particles coated with calcium carbonate, ceramic particles, glass particles, and polyethylene particles; and
   c) a reactive pigment; and
      wherein said coating composition has a PVC of 25 to 65% and a NVV of 30 to 50%, and wherein a single coat of the coating composition has exterior durability as measured by QUV testing and indicated by a $\Delta E$ of less than 3, and tannin blocking as measured on a redwood substrate and indicated by at least a 30% improvement in the y-reflectance.

2. The coating composition of claim 1, wherein the microspheres have a diameter in a range of from about 1 to about 210 microns.

3. The coating composition of claim 1, wherein the reactive pigment comprises phosphosilicate.

4. The coating composition of claim 1, wherein the coating composition is for use as a single layer coating.

5. A coated substrate comprising:
   a) a substrate containing tannin; and
   b) a coating disposed over said substrate, said coating formed from a coating composition comprising:
      i) at least one tannin blocking latex resin;
      ii) microspheres having a maximum pigment loading of at least 50%, said microspheres being selected from the group consisting of expanded acrylonitrile/ vinylidene chloride copolymer particles, sodium potassium aluminum silicate particles, polyvinylidene chloride copolymer particles coated with calcium carbonate, ceramic particles, glass particles, and polyethylene particles; and iii) a reactive pigment; and wherein said coating composition has a PVC of 25 to 65% and a NVV of 30 to 50%, and wherein a single coat of the coating composition has exterior durability as measured by QUV testing and indicated by a ΔE of less than 3, and tannin blocking as measured on a redwood substrate and indicated by at least a 50% improvement in the y-reflectance.

6. The coated substrate of claim 5 wherein said substrate containing tannin is a wood selected from the group consisting of redwood, cedar, white pine, yellow pine and oak.

7. The coated substrate of claim 5 wherein the microspheres have a diameter in a range of from about 1 to about 210 microns.

8. The coated substrate of claim 5 wherein the reactive pigment comprises phosphosilicate.

9. A process for coating a substrate containing tannin to block the tannin and provide exterior durability to said substrate wherein said process consists essentially of the steps of:

a) applying a single coat of a coating composition to the substrate, said coating composition comprising:

i) at least one tannin blocking latex resin; and ii) microspheres having a maximum pigment loading of at least 50%, said microspheres being selected from the group consisting of expanded acrylonitrile/vinylidene chloride copolymer particles, sodium potassium aluminum silicate particles, polyvinylidene chloride copolymer particles coated with calcium carbonate, ceramic particles, glass particles, and polyethylene particles; and iii) a reactive pigment; and wherein said coating composition has a PVC of 25 to 65% and a NVV of 30 to 50%, and wherein a single coat of the coating composition has exterior durability as measured by QUV testing and indicated by a ΔE of less than 3, and tannin blocking as measured on a redwood substrate and indicated by at least a 30% improvement in the y-reflectance; and b) allowing said coating composition to dry.

10. The process of claim 9 wherein said substrate containing tannin is a wood selected from the group consisting of redwood, cedar, white pine, yellow pine and oak.

11. The process of claim 9, wherein coated substrate of claim 5 wherein the microspheres have a diameter in a range of from about 1 to about 210 microns.

12. The coated substrate of claim 9, wherein the reactive pigment comprises phosphosilicate.

* * * * *